(12) United States Patent
Johnson et al.

(10) Patent No.: US 8,017,192 B2
(45) Date of Patent: Sep. 13, 2011

(54) RADIATION CURED COATINGS FOR IMAGE FORMING DEVICE COMPONENTS

(75) Inventors: Mark William Johnson, Lexington, KY (US); Kelly Ann Killeen, Lexington, KY (US); David Starling MacMillan, Winchester, KY (US); Bart Mansdorf, Lexington, KY (US); Donald Wayne Stafford, Georgetown, KY (US); Mark Stephen Weisman, Jr., Huntington, WV (US)

(73) Assignee: Lexmark International, Inc., Lexington, KY (US)

( * ) Notice: Subject to any disclaimer, the term of this patent is extended or adjusted under 35 U.S.C. 154(b) by 906 days.

(21) Appl. No.: 11/778,684

(22) Filed: Jul. 17, 2007

(65) Prior Publication Data

US 2009/0022902 A1    Jan. 22, 2009

(51) Int. Cl.
*G03G 15/08* (2006.01)
*C08F 2/46* (2006.01)

(52) U.S. Cl. ........ 427/496; 427/503; 427/508; 427/515; 430/56; 522/96; 522/173

(58) Field of Classification Search .................. 430/56; 522/103, 96, 107, 99, 172, 173, 176, 178, 522/180, 181, 182; 427/496, 503, 508, 515
See application file for complete search history.

(56) References Cited

U.S. PATENT DOCUMENTS

| | | | | |
|---|---|---|---|---|
| 3,519,819 A | | 7/1970 | Gramza et al. | |
| 4,133,723 A | * | 1/1979 | Howard | 427/519 |
| 4,282,269 A | * | 8/1981 | Lucey | 427/514 |
| 4,935,454 A | * | 6/1990 | Koblitz et al. | 522/24 |
| 4,960,614 A | * | 10/1990 | Durand | 427/511 |
| 5,162,183 A | | 11/1992 | Lindblad et al. | |
| 5,352,552 A | | 10/1994 | Maruyama et al. | |
| 5,391,449 A | | 2/1995 | Maruyama et al. | |
| 5,422,210 A | | 6/1995 | Maruyama et al. | |
| 5,455,135 A | | 10/1995 | Maruyama et al. | |
| 5,585,214 A | | 12/1996 | Kashimura et al. | |
| 5,665,791 A | | 9/1997 | Lee et al. | |
| 5,707,767 A | | 1/1998 | Yu | |
| 5,725,983 A | | 3/1998 | Yu | |
| 5,797,076 A | | 8/1998 | Bracken et al. | |
| 5,834,564 A | | 11/1998 | Nguyen et al. | |
| 5,928,726 A | | 7/1999 | Butler et al. | |
| 5,965,243 A | | 10/1999 | Butler et al. | |
| 6,016,414 A | | 1/2000 | Anayama et al. | |
| 6,020,098 A | | 2/2000 | Bretscher et al. | |
| 6,106,989 A | | 8/2000 | Bretscher et al. | |
| 6,194,106 B1 | | 2/2001 | Bretscher et al. | |
| 6,200,715 B1 | | 3/2001 | Fuller et al. | |
| 6,323,301 B1 | | 11/2001 | Smith et al. | |

(Continued)

FOREIGN PATENT DOCUMENTS

EP    1531369 A1    5/2005

*Primary Examiner* — Susan W Berman (57) ABSTRACT

The present disclosure relates to the use of radiation cured coatings that may be used in a device within an image forming apparatus. The coating composition may include a reactive oligomer capable of radiation curing having a number average molecular weight (Mn) of greater than 1500. A reactive diluent may then be combined with the reactive oligomer, which diluent is also capable of radiation curing and which has a Mn of less than or equal to 1500. The reactive diluent may be present at a level of less than fifty percent by weight of the coating composition. The coating composition may be present at a solids level of 90-100%.

6 Claims, 4 Drawing Sheets

U.S. PATENT DOCUMENTS

| | | |
|---|---|---|
| 6,337,165 B1 | 1/2002 | Fujii et al. |
| 6,340,528 B1 | 1/2002 | Hsieh et al. |
| 6,342,324 B1 | 1/2002 | Li et al. |
| 6,372,397 B1 | 4/2002 | Maruyama et al. |
| 6,416,915 B1 | 7/2002 | Kikuchi et al. |
| 6,436,597 B2 | 8/2002 | Maruyama et al. |
| 6,596,818 B1 | 7/2003 | Zamore |
| 6,660,399 B1 | 12/2003 | Kitano et al. |
| 6,751,435 B2 | 6/2004 | Hsieh et al. |
| 7,013,104 B2 | 3/2006 | MacMillan et al. |
| 7,138,213 B2 | 11/2006 | Itakura et al. |
| 7,162,191 B2 | 1/2007 | DiGirolamo et al. |
| 2005/0105935 A1 | 5/2005 | Schlafer et al. |
| 2005/0119373 A1 | 6/2005 | Taylor et al. |

* cited by examiner

RADIATION CURED COATINGS FOR IMAGE FORMING DEVICE COMPONENTS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to radiation cured coatings for use in an image forming device, and more particularly to radiation cured coatings for use on an image forming device component such as a doctor blade.

2. Description of the Related Art

Many devices used in image forming apparatus may utilize coatings for various purposes. These purposes may include modification of electrical, physical and chemical properties such as resistivity, roughness, or surface energy. The devices upon which the coatings may be applied within an image forming apparatus may include photo-conductive devices and non-photoconductive rollers such as developer rollers, doctor blades, etc.

SUMMARY OF THE INVENTION

In a first exemplary embodiment, the present disclosure relates to a coating composition for a printer component, such as a doctor blade. The coating composition may include a reactive oligomer capable of radiation curing having a number average molecular weight (Mn) of greater than 1500. The reactive oligomer may be present at a level of greater than fifty percent by weight of the coating composition. A reactive diluent may then be combined with the reactive oligomer, which diluent is also capable of radiation curing and which has a Mn of less than or equal to 1500. The reactive diluent may be present at a level of less than fifty percent by weight of the coating composition.

In a second exemplary embodiment the present disclosure relates to a printer component containing a coating composition comprising a reactive oligomer capable of radiation curing having a number average molecular weight (Mn) of greater than 1500, wherein the reactive oligomer is present at a level of greater than fifty percent by weight of the coating composition. The reactive oligomer may have the following formula:

wherein n has a value of 1-8, R1 is a hydrogen atom or a substituted or unsubstituted aliphatic or aromatic group and G contains one or more of the following groups: urethane, urea, urea-urethane, amide, siloxane, ether, butadiene, or ester functionality. A reactive diluent may be added that is also capable of radiation curing having a Mn of less than or equal to 1500 wherein the reactive diluent is present at a level of less than fifty percent by weight of the coating composition and has the following formula:

wherein n has a value of 1-6, R1 comprises a hydrogen atom or a substituted or unsubstituted aliphatic or aromatic group and G contains one or more of the following groups: urethane, urea, urea-urethane, amide, siloxane, ether, butadiene, ester, trifluroethyl, or mecapto functionality. The coating composition may be present at a level of about 90-100% solids and include one layer in contact with the printer component and an outer layer with an exposed surface, wherein the tensile modulus of the layer in contact with the printer component is less than the tensile modulus in the layer providing the exposed surface.

In a further exemplary embodiment, the present disclosure relates to a method that includes coating a printer component with a coating composition including (i) a reactive oligomer capable of radiation curing having a number average molecular weight (Mn) of greater than 1500, wherein the reactive oligomer is present at a level of greater than fifty percent by weight of the coating composition and (ii) a reactive diluent capable of radiation curing having a Mn of less than or equal to 1500 wherein the reactive diluent is present at a level of less than fifty percent by weight of the coating composition. The coating composition may again be present at a level of about 90-100% solids. The method may then continue with the step of exposing the coating composition to electromagnetic radiation and forming a crosslinked coating on the printer component.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present invention relates to the use of radiation cured coatings that may be used in a device within an image forming apparatus. The device may also be used within a printer cartridge (e.g. toner cartridge). The device may therefore supply a substrate and substrate surface which may be coated. Prior to coating the surface of the substrate may be pretreated, which may include corona discharge and/or treatment with a coupling agent, such as a silane or titanate compound. In particular, the present disclosure applies to the coating of a doctor blade, which may be understood as any device that may regulate the amount of toner that may be carried, e.g., by a roller, such as a developer roller, to a photoconductor member in an electrophotographic device. The doctor blade is typically configured such that it is biased into pressing enagement with the developer roller. Such pressure that may be developed in a nip (contact area) between the doctor blade and developer roller may then provide a relatively thin, uniform layer of toner on the developer roller which in turn is carried to the photoconductor for the ensuing printing operation.

The radiation cured coatings, as referred to herein, may be understood as coatings that are sourced from one or more chemical components which may increase in viscosity and/or molecular weight though a polymerization and/or cross-linking reaction. The chemical component may therefore amount to monomers, oligomers and/or diluents which may react (cure) and undergo initiation by a radiation source. Such chemical components may therefore contain one or more polymerizable functionalities which may be understood as any chemical group capable of undergoing polymerization in the presence of some form of electromagnetic radiation (e.g. visible light over the wavelength range of about 400-700 nm and/or ultraviolet light over the wavelength range of about 200-400 nm). In addition, the chemical components herein may undergo polymerization in the presence of an electron beam. Furthermore, the chemical components herein may employ a photoinitiator, which facilitates, e.g., the formation of free-radicals to initiate a given free-radical polymerization reaction.

The radiation cured coatings may be present at relatively high solids level, e.g. 90-100% solids level, which may be understood as substantially free of other components such as one or more solvents (relatively low molecular compounds with MW of under about 500 which may be fluids at room temperature). For example, by completely eliminating the presence of all solvents (e.g. 100% solids) the present disclosure therefore provides the opportunity to coat a given printer component (e.g. doctor blade) without the need for any solvent recovery. In addition, it may be appreciated that by utilizing radiation to initiate curing one may avoid the need for thermal cured systems which typically require relative higher energy input to trigger a given polymerization reaction.

The radiation cured coating system herein, which is sourced from one or more chemical components may include as one component therein, a reactive oligomer. Reference to oligomer herein may therefore be understood as a component that has a number average molecular weight (Mn) of greater than 1500 g/mole. More specifically, Mn may have a value of greater than 150 to about 20,000 g/mole, including all values and increments therein. Such reactive oligomers may also be present in a given coating system as the major component, i.e. at a level of greater than 50% by weight of the reaction mixture, or at levels above 50% to 99% by weight, including all values and increments therein.

The reactive oligomers herein may provide for a wide range of final polymer structures, as the pendant functional groups that may be associated with the reactive and polymerizing functionality may be independent and may therefore be selected according to the requirements of any particular coating application. Accordingly, the reactive oligomer herein may be a functionalized vinyl component and in particular, a vinyl functionalized acrylate of the following general formula:

wherein n may have a value of between 1-8 (higher numbers providing larger relative amounts of crosslinking) and R1 may be a hydrogen atom, aliphatic, aromatic, substituted aliphatic or substituted aromatic group and G may provide a variety of functional groups. Such functional groups may be present between the reactive end-groups in those situations where n has a value greater than 1.0. For example, G may provide urethane (—NHCOOR—), urea (—NHCONHR—), urea-urethane, amide (—NHCOR—), siloxane (—Si—O—), ether (—CH$_2$—O—), butadiene (—CH$_2$—CH═CH—CH$_2$—) and/or ester (—COOR—) type functional groups. In addition, G may provide epoxy derived functionality, for example, repeating units formed from epichlorohydrin and bisphenol A which may be illustrated as follows, where y is an integer suitable to provide a number average molecular weight to the reactive oligomer, as noted above, of greater than 1500:

By way of further example, in the case where n has a value of 2, and G provides urethane functionality, a urethane/acrylate may be provided whose structure may be as follows:

wherein R2 may be an aliphatic or aromatic group, and R3 may provide, e.g., ether and/or ester type functionality and/or polyether and/or polyester functionality, in which case the polyether and/or polyester may itself may have a molecular weight of about 500-2500. The value of x may between 1-100, such that the polyurethane linkage provided therein may have a MW of, e.g., between about 1,000-50,000. For example, in the above situation where R3 provides ether functionality, the reactive oligomer may have the following structure:

Accordingly, it may be appreciated that one may also utilize a urea/acrylate, whose structure may be represented as indicated below, which includes urea type linkages between the indicated end-group acrylic functionality:

Upon exposure to electromagnetic radiation, as noted above, the indicated exemplary end groups of acrylic type functionality may undergo free-radical polymerization. As applied to the exemplary urethane/acrylate noted above, the following may therefore be provided as the coating layer for a doctor blade in an electrophotographic printer:

Exemplary coating formulations herein may be obtained from Cytec Industries which radiation curable resins are identified under the EBECRYL® trademark. For example, one may utilize EBECRYL 244 which is identified as an aliphatic urethane diacrylate with a working viscosity of 190,000 centipoise at 25° C. Another exemplary radiation curable resin includes EBECRYL 1360 which is identified as siloxane hexaacrylate with a viscosity of 1600 centipoise at 25° C. as well as EBECRYL 524 which is identified as polyester diacrylate with a viscosity of 61,234 at 25° C. In addition, one may utilize EBECRYL 3708 which is identified as a bisphenol A/expoxy diacrylate with a viscosity of 190,000 at 25° C. Other contemplated reactive oligomers include CN-307 (diacrylate terminated polybutadiene) which may be illustrated with the following formula where y may again have a value suitable to provide a value of Mn of greater than 1500 g/mole.

The second component that may be employed to form the radiation cured coating on the exemplary doctor blade may be a reactive diluent, which may be understood herein as a chemical component, similarly capable of radiation curing, but which has a number average molecular weight (Mn) of less than or equal to 1500 g/mole. More specifically, Mn of the diluent may be between about 50-1500 g/mole, including all values and increments therein. Such reactive diluent may also be present in a given coating system as the minor component, i.e., at a level of less than 50% by weight of the reaction mixture.

The reactive diluent herein, similar to the reactive oligomer noted above, may again provide for a wide range of final polymer structures, as the pendant functional groups that may be associated with the reactive and polymerizing functionality may also be independent and again selected according to the requirements of any particular coating application. Accordingly, the reactive diluent herein may similarly be a functionalized vinyl such as a vinyl acrylate of the following general formula:

wherein n may have a value of between 1-6 (higher numbers providing larger relative amounts of crosslinking) and R1 may again be a hydrogen atom or substituted or unsubstituted aliphatic or aromatic group and G may provide a variety of functional groups. Such functional groups may be present between the reactive end-groups in those situations where n has a value greater than 1.0. For example, G may provide urethane (—NHCOOR—), urea (—NHCONHR—), ureaurethane, amide (—NHCOR—), siloxane (—Si—O—), ether (—CH$_2$—O—), butadiene (—CH$_2$—CH=CH—CH$_2$—), trifluroethyl (—CH$_2$CF$_3$), mercapto (—CH$_2$CH$_2$SH) and/or ester (—COOR) type functional groups.

The reactive diluent may also be sourced from compounds that undergo ionic (e.g. cationic) type polymerization. For example, this may include cycloaliphatic epoxy functionality of the following general formula:

wherein n may have a value of 1-6 and A may be a substituted or unsubstituted aliphatic, cycloaliphatic or aromatic group. For example, one may utilize CRYACURE 6110 available from Dow Chemical which has the following general formula:

In addition, one may utilize those vinyl monomers that include an electron donating type group that would facilitate cationic polymerization, such as vinyl ether type compounds. It may therefore be appreciated that in the case of a vinyl ether type compound, they may undergo either a radical and/or ionic type polymerization, depending upon the particular source of initiation.

Accordingly, it may be appreciated that the vinyl ether type compounds may be of the following general structure:

where R1 may be a hydrogen atom or a substituted or unsubstituted aliphatic and/or aromatic group and A may be a substituted or unsubstituted aliphatic or aromatic group. One particular vinyl ether may therefore include octadecyl vinyl ether of the following general formula:

Other exemplary reactive diluents therefore include as follows:

(a) 1,6-hexanediol diacrylate which may be represented as follows:

(b) GENOMER 1122 from Rahn A G, which is a monofunctional urethane acrylate having the following general structure:

wherein R may by an aliphatic, aromatic, substituted aliphatic and/or substituted aromatic functional group;

(c) isobornyl acrylate which may be represented by the following general structure:

(d) 2-(2-ethocyethoxy)ethyle acrylate which may be represented by the following formula:

(e) metallic acrylates, which may be represented by the formula wherein M may include at least one member from the group consisting of zinc, aluminum, magnesium, tin, copper, or nickel, R1 may again be a substituted or unsubstituted aliphatic or aromatic group and n may have a value of 2 or higher, which may be determined by the number of acrylic functional groups coordinating with a given metal.

(f) 2,2,2,-trifluorethylmethacrylate which may be represented by the following formula:

(g) trimmethylopropane tris(3-mercaptopropionate) which may be represented by the following formula:

In addition to the above, it is contemplated that the reactive diluent may also be sourced from N-vinyl pyrrolidone, styrene, vinyl acetate, maleic anhydride and maleimide type compounds.

With respect to the above systems, fillers may be employed, which fillers may be present at levels of less than or equal to about 30% by weight. The fillers contemplated for use herein may first include metallic fillers, such as silver, aluminum, copper, and gold. The metallic fillers may also include metallic coated particles, such as metallic coated glass particles, an example of which includes CONDUCTO-FIL silver-coated glass particles from Potters Industries.

Other fillers that may be utilized herein include conductive materials, such as carbon black and/or graphite. The conductive material may also include doped organic polymers, wherein the dopant includes an ionic salt to enhance conductivity. Polymers suitable for doping therefore may include polyaniline, polythiophenes, poly-p-phenylenes and/or polyacetylenes. The fillers for use herein may also include polymeric fillers, not providing conductivity, which may therefore include a material such as acrylic type beads such as ESPRIX MX-300 which reportedly have an average particle diameter of about 3 microns, which are available from Soken Kagaku Co., Ltd. Fillers may also include ionic types salts such as $LiPF_6$, $LiClO_4$, $Li[—SO_2—(CF_2)_4—SO_2—N—]$ (cyclic imide), $LiBF_4$, $LiCF_3SO_3$, $Cs(CF_3COCH_2COCF_3)$, $LiN(SO_2CF_3)_2$, $LiC(SO_2CF_3)_3$, $LiPF_2(C_2F_5)$, $KPF_6$, $NaPF_6$, $CuCl_2$, $Bu_4NPF_6$, $Bu_4NSO_3CH_3$, $Bu_4NCl$, $Bu_4NBr$, and dimethyl(ethyldodecylammonium ethosulfate). In addition, the fillers may include either hydrophobic or hydrophilic silicas, such as Degussa Aerosil R8200 or polymethylsilsesquioxane (TOSPEARLS 240 from Toshiba).

The radiation curable systems herein may also include an appropriate initiator. Such initiators may also be included in the reactive mixtures of the coating materials. The initiators may include those suitable for radiation polymerization and may include, for example, photo-initiators, etc. The initiators may therefore include any compound that is capable of absorbing light or radiation and providing a reactive site, such as a free-radical, cationic or anionic source. Such initiators may therefore include those which undergo Norrish Type I (homolytic cleavage upon UV exposure producing radicals) and/or Norrish Type II (hydrogen-abstraction) photochemical reactions including alpha-hydroxy ketones (such as IRGACURE 184 available from Ciba), acylphosphines (such as DAROCURE TPO available from Ciba), aminoalkylphenones (such as IRGACURE 369 available from Ciba), benzophenone, ADDITOL ITX from Cytec, as well as co-initiators such as primary-, secondary-, tertiary-amines or primary-, secondary-, tertiary-ethers. Cationic initiators may include onium salts (such as UVI-6976 sulfonium available from Dow Chemical, or organometallic complexes (such as IRGACURE 784 available from Ciba).

The coating systems noted above may therefore be applied to substrate devices within an image forming apparatus such as doctor blades, developer rollers, etc. Such devices themselves may also be photoconductive or non-photoconductive components. The coatings may also be applied to devices in order to serve as an adhesive. The device substrate may therefore include conductive metals such as brass, phosphorous bronze, beryllium copper, stainless steel, aluminized polyester, indium tin oxide coated glass, as well as non-conductive materials such as polyester, polycarbonate, polyurethane, epoxide, polyamide, polyolefins and polystyrene.

The coating compositions/reactive mixtures may be applied to the substrate device by a number of processes such as spray, dip, flow, curtain, knife-over-roll, gravure, meyer and reverse rod, slot die, spin casting, etc. Some processes may be enhanced by electrostatic control or ultrasonic droplet generation in a given coating method. The coating may be applied at about 1 to 10,000 microns in thickness, including all values and increments therebetween. The coating may be formed from a build-up of one or more layers. The layers may be applied, e.g., while an underlying layer is reacting and in a viscous liquid state or when an underlying layer has reached a gel point or solidified.

Figure 1:
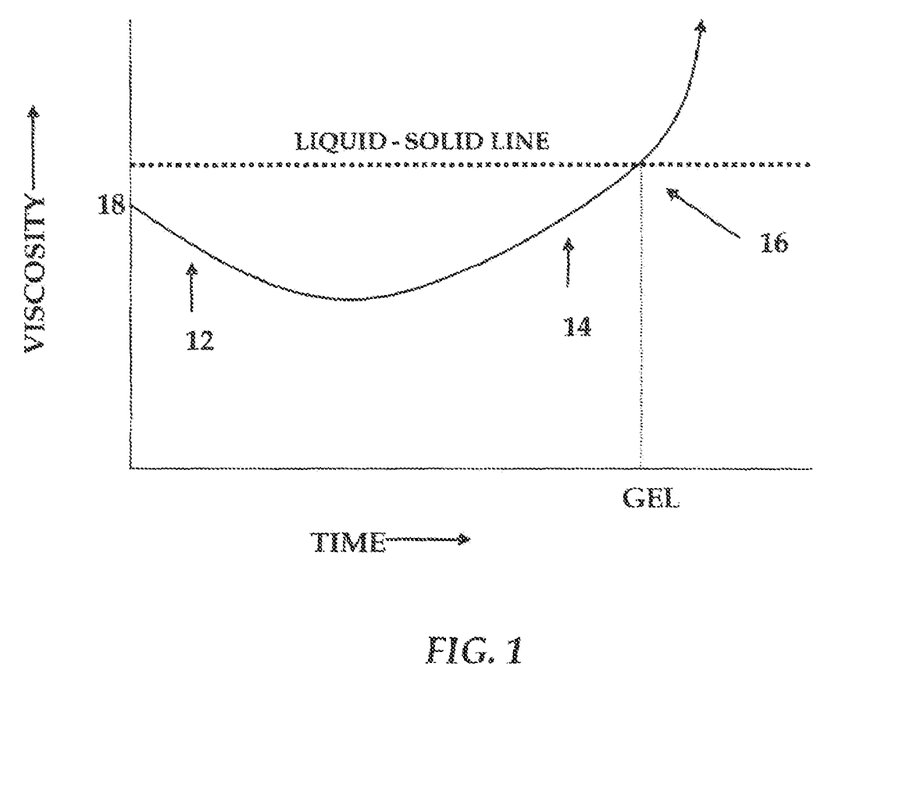
FIG. 1 illustrates an exemplary viscosity v, time graph for a chemical component undergoing radiation curing.

Prior to exposure or reacting, the coating may have an initial viscosity of about 1.0 to 500,000 centipoise, including all values and increments therebetween. Once exposed however, the viscosity of the coating may increase along with molecular weight and the viscosity ultimately increases as the material proceeds to solidify. As illustrated in FIG. 1, and as noted above, at 18 one may begin with a chemical component that has a viscosity of about 1.0-500,000 centipoise. Upon exposure to radiation, the viscosity may show an initial drop at 12 due to the exothermic nature of the polymerization (curing) reaction. However, at a certain point, the effect of the exotherm may be overcome by the build-up in molecular weight and viscosity that occurs, which is shown generally at 14.

As the reaction proceeds, the build-up in molecular weight and viscosity approaches a region 16 where the reaction mixture may cross a liquid-solid line, and the reaction mixture solidifies. Such region 16 may also be termed a "gel" point, which may be understood at that point in the reaction where crosslinking has developed to such levels that the reaction mixture "gels", approaches solidification, and may also be observed as being generally insoluble in most solvents. Accordingly, prior to crossing the liquid-solid line, the chemical component undergoing radiation curing herein may be texturized by, e.g., embossing the surface of the coating (e.g., pressing a pattern into the coating surface). Therefore, one may texturize the coating prior to or during radiation curing, and prior to the point in which the viscosity crosses a liquid-solid line.

Radiation sources may include for example, ultraviolet light, visible light or an electron beam. For example, ultraviolet (UV) light may be directed at the coating to be cured. Upon exposure the UV light may interact with the chemical components of the polymer coating material causing polymerization and/or crosslinking. Furthermore, process variables that may be varied in the use of ultraviolet radiation include, for example, frequency range, power level and exposure time.

In electron beam radiation, the polymer material coating may be bombarded with high-energy electrons. The polymer materials may again undergo a number of reactions that may include, for example, polymerization and/or crosslinking as well as chain scission and/or molecular rearrangement. Process variables that may again be varied include power and exposure time.

Radiation exposure may occur in an inert atmosphere employing inert gases such as nitrogen, argon, or other non-reactive gasses. The radiation may also be manipulated or altered so as to direct, focus or disperse the radiation emanating from the radiation source. This may be accomplished via devices such as reflective devices including optical mirrors, lenses, dichroic filters and electromagnetic lenses.

It is also contemplated herein that when coating a given component such as a doctor blade, it may be useful to initially provide a first radiation cured coating layer which may have relatively lower functionality than any ensuing layers that may be applied. In this manner it may allow for the formation of a first layer with a relatively lower crosslinking density than ensuing or outer layers which may provide for relatively higher crosslink density and associated mechanical properties (relatively higher moduli and hardness values). In this manner, it is contemplated that the relatively lower crosslinking density for the first coating layer, in contact with the substrate surface, may have relatively higher flexibility and therefore not be as susceptible to brittle failure when the doctor blade may be flexed against a developer roller to form contact surfaces at the nip location.

For example, the coating layer applied directly to the printer component may have a crosslink density that provides a tensile modulus (E) of less than or equal to about 75,000 psi. The outer layer, which has an exposed surface for engaging and controlling the thickness of toner on a developer roller, may have a tensile modulus greater than 75,000 psi, and in fact, may have a modulus value of greater than 75,000 psi to about 1 million psi, including all values and increments therein. As also noted above, the outer layers may have a relative hardness (for example Shore Hardness) value that is also greater than the hardness values for the initial coating layer, which again may be attributed to a differential in crosslink density. For example, the outer layers may have a Shore Hardness value of greater than 50D whereas the layer in contact with the printer component may have a Shore Hardness value of less than 50D. It may therefore be appreciated that for a given coating, the crosslink density may increase from the initial coating layer to the outer coating layer, wherein the layers may provide excellent adhesion to one another, which may be attributed to crosslinking between the layers as they are applied and reacted on the surface of a given component as well as their overall chemical similarity.

As alluded to above, the radiation cured coating may also be textured. Texturing or a textured surface may be understood herein as the development of a surface wherein the surface profile is not substantially uniform. Stated another way, the surface may have variations, a surface roughness or even a pattern formed therein. The surface may have, e.g., projections extending from the surface or indentations.

Figure 2:
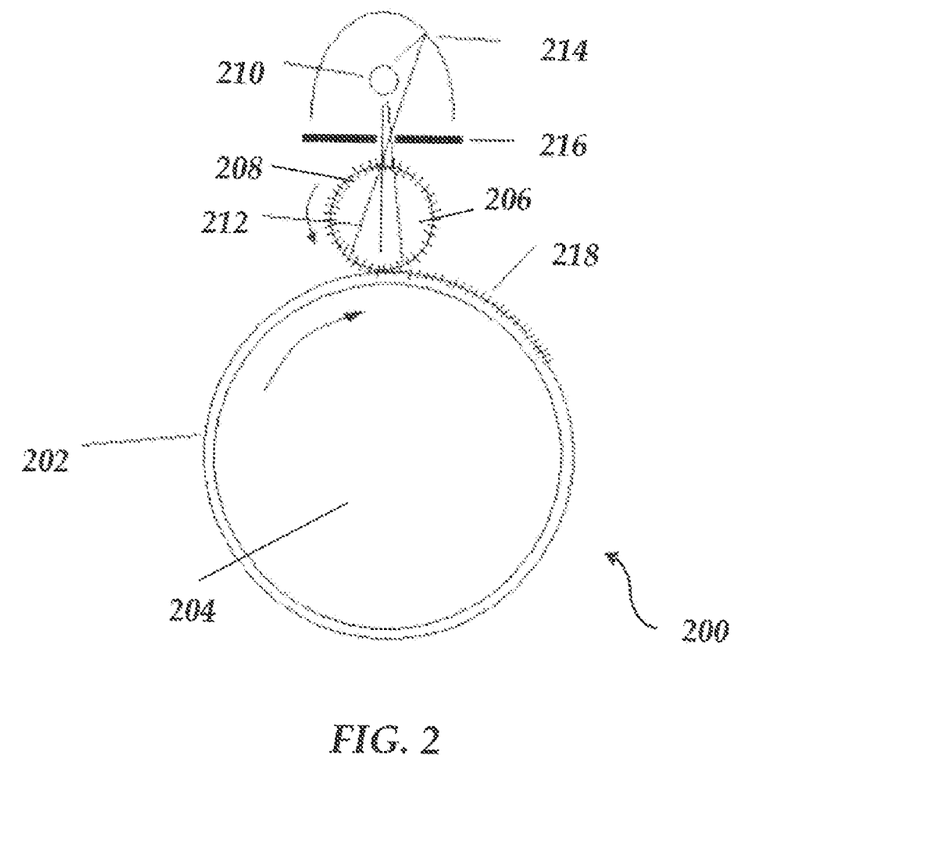
FIG. 2 illustrates one exemplary technique for texturing a surface, such as a roller surface.

One exemplary process which may be used for texturing the coating is illustrated in FIG. 2. A substrate 200, such as a developer roll, may be supplied with a coating 202 formed on the outer surface of the roll 204. A roller 206 including a textured surface 208 may be applied to the coating, embossing the coating 202. The embossing device may be applied to the coating in the range of 0 to 100 pounds per square inch (psi), including all increments and ranges therebetween, such as 10 pounds per square inch, 50 pounds per square inch, etc.

It should be appreciated that while a roller is illustrated and described other embossing devices, such as belts, stamps, screens or plates may be used. It should also be appreciated that the embossing device may be translucent, semi-transparent or transparent to the radiation employed, such as visible, UV, infrared or high energy electrons. For example, greater than 50% of the radiation may pass through the embossing device, including all increments or values therein, i.e., 70%, 90%, etc. Furthermore, the embossing device may not be immediately applied in a contacting relationship with the coating or with sufficient pressure to emboss the coating until a desired increase in viscosity or increase in molecular weight has been reached. See again, FIG. 1.

A radiation source such as a UV lamp 210, electron beam emitter, visible light, or an infrared lamp, may be provided which may utilize, for example, one or a combination of mirrors such as the elliptical mirror illustrated 214, lenses such as the opaque shield including a slit 216, dichroic filters, or an electromagnetic lens to deflect, filter or focus the radiation, such as UV light 212 through the embossing device 206 and onto the coating 202. The coating 202, exposed to the UV light may then increase viscosity or molecular weight through polymerization or crosslinking and include a texture 218 formed thereon.

Figure 3A:
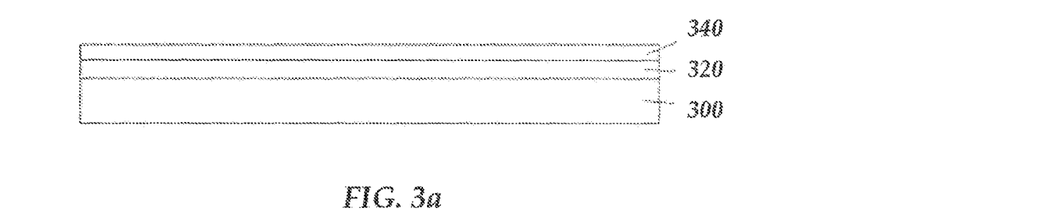
FIG. 3 illustrates another exemplary technique for texturing a surface of a component containing radiation cured resin.
Figure 3B:
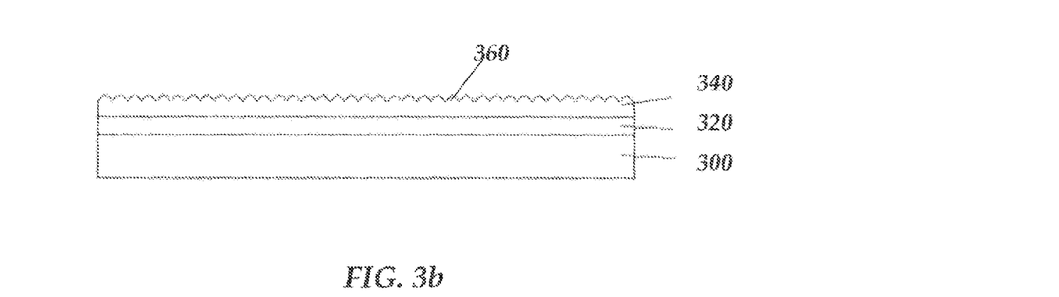

Another exemplary process which may be used for texturing the coating is illustrated in FIGS. 3a and 3b. Attention is therefore directed to U.S. application Ser. No. 11/400,494 whose teachings are incorporated by reference. A substrate 300 may be provided upon which two or more coating layers may be applied. A first coating layer 320, including a first chemical component, may be applied to the substrate 300. A second coating layer 340, including a second chemical component, may be applied to the first coating layer 320. Where the second coating layer may be a final coating layer, the second coating layer may provide a surface.

The first coating layer 320 may have a higher shrinkage during reaction (cure) than the second coating layer 340. This may be a consequence of the feature that e.g., monomers, upon polymerization or crosslinking, may typically reduce in volume relative to the solid (polymeric) material that is formed. Accordingly, upon exposure to radiation, the coatings may increase in viscosity via polymerization or crosslinking, and the differential shrinkage between the two coating layers may create a texture 360 in the second coating layer, as illustrated in FIG. 3b. For example, the first layer may have a volumetric shrinkage ($VS_1$) that is about 0.1% to 20% greater than the volumetric shrinkage of the second layer ($VS_2$), including all values and increments therebetween, such as 1%, 10%, etc. It should also be appreciated that the second layer ($VS_2$) may have a volumetric shrinkage that is about 0.1% to 20% greater than the volumetric shrinkage of the first layer ($VS_1$), including all values and increments therebetween, such as 1%, 10%, etc.

The coatings employed herein may generally exhibit a number of properties. For example, the coating may have a surface energy between 5 and 90 dyne/cm and all increments or values therebetween, including 10 dyne/cm, 20 dyne/cm etc. The coating may have an elongation at break of between 1% to 500% and all increments or values therebetween, including 20%, 90%, etc. The coating may also have a surface roughness of between 0.01 to 10.0 microns Ra including all values and increments therebetween, as measured by a contact profilometer. The Ra is the average deviation of the true surface from the theoretical mean surface across the trace length. Additionally, the coating may exhibit a bulk resistivity of about 1.0 ohm-cm to $1 \times 10^5$ ohm-cm, including all increments and values therebetween, such as $1 \times 10^4$ ohm-cm, $1 \times 10^5$ ohm-cm, etc, and a dielectric constant between about 1 and 15 and any increment or value therebetween. Furthermore, the cured coating may exhibit a thickness in the range of about 1 to 10,000 Mm, including all values and increments therein.

Figure 4:
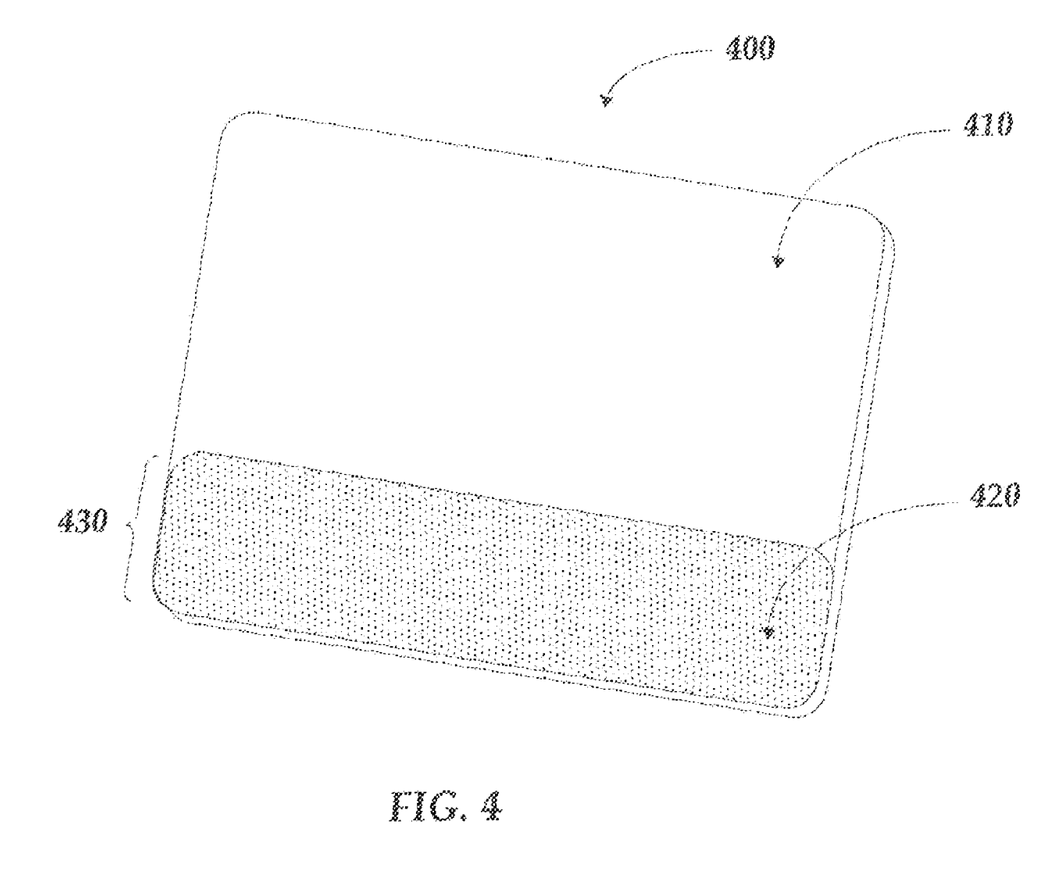
FIG. 4 illustrates an exemplary view of a doctor blade with a radiation cured coating.

Attention is next directed to FIG. 4, which provides an exemplary view of a doctor blade 400 which may be formed from a substrate 410 and include a radiation cured coating 420. It is to be noted that a doctor blade that may be employed in the present disclosure includes the doctor blade disclosed in the toner regulating system found in U.S. Pat. Nos. 7,013,104 and 7,162,191 whose teachings are incorporated herein by reference. In addition, although the radiation cured coating is shown on a portion of the blade surface that may contact, e.g., a developer roller, it is contemplated herein that the coating may be applied over the entire surface of the blade. Accordingly, as shown at 430 the radiation cured coating may cover about 5-40% of the surface of the doctor blade that is designed to come in contact with the developer roller in a given electrophotographic device. In addition, the substrate material may have the appropriate flexibility to be biased against the developer roller and have appropriate electrical conductivity so as to allow for a bias voltage differential as between the doctor blade and the developer roller to be controlled which may then allow the charge level of the residual toner on the developer roller to be properly controlled. The level of any such induced charging (if any) may depend upon the particular application. For example, the residual toner on the developer roller may have a thickness in the range of about 4 μm to about 20 μm at 0.3-1.2 mg/cm² and a charge of about −12 μC/gram to −35 μC/g. In addition, as may be appreciated, the doctor blades herein may be used with toner that is mono-component or multi-component, magnetic or non-magnetic, color or black, or any other toner used in an electrophotographic system.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A radiation cured coating on a printer component obtained by curing a composition comprising
   (a) a reactive oligomer capable of radiation curing having a number average molecular weight having (Mn) of greater than 1500, wherein said reactive oligomer is present at a level of greater than fifty percent by weight of the coating composition wherein said reactive oligomer has the following formula:

wherein n has a value of 1-8, R1 is a hydrogen atom or a substituted or unsubstituted aliphatic or aromatic group and G contains one or more of the following groups: urethane, urea, urea-urethane, amide, siloxane, ether, butadiene, or ester functionality; and
   (b) a reactive diluent capable of radiation curing having a Mn of less than or equal to 1500 wherein said reactive diluent is present at a level of less than fifty percent by weight of the coating composition and has the following formula:

wherein n has a value of 1-6, R1 comprises a hydrogen atom or a substituted or unsubstituted aliphatic or aromatic group and G contains one or more of the following groups: urethane, urea, urea-urethane, amide, siloxane, ether, butadiene, ester, trifluroethyl or mecapto functionality; and
   wherein (1) said coating composition is present at a level of about 90-100% solids and comprises one layer in contact with said printer component and an outer layer with an exposed surface; (2) the tensile modulus of said layer in contact with said printer component is less than or equal to 75,000 psi and said outer layer with said exposed surface has a tensile modulus of greater than 75,000 psi; and (3) said component is located in a printer cartridge.

2. A method comprising:

coating a printer component located in a printer cartridge with a coating composition according to claim 1; and exposing said coating composition to electromagnetic radiation and forming a crosslinked coating on said printer component.

3. The method of claim 2 wherein said coating composition is applied at a thickness of about 1-10,000 microns.

4. The method of claim 2 wherein said coating composition has a viscosity of 1.0-5000,000 centipose.

5. The method of claim 2 wherein said coating has a surface roughness of about 0.01-10.0 microns average deviation of the true surface from the theoretical mean surface across the trace length (Ra).

6. The method of claim 2 wherein said coating has a bulk resistivity of about 1.0 to $1 \times 10^{15}$ ohm-cm.

* * * * *